(12) United States Patent
Choi et al.

(10) Patent No.: US 11,836,503 B2
(45) Date of Patent: Dec. 5, 2023

(54) ELECTRONIC DEVICE FOR EXECUTING HETEROGENEOUS OPERATING SYSTEMS AND METHOD THEREFOR

(71) Applicant: Samsung Electronics Co., Ltd., Suwon-si (KR)

(72) Inventors: Kwangsik Choi, Suwon-si (KR); Donguk Seo, Suwon-si (KR); Kyungjoong Shin, Suwon-si (KR); Myungsu Cha, Suwon-si (KR); Junyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 17/594,286

(22) PCT Filed: Apr. 6, 2020

(86) PCT No.: PCT/KR2020/004634
§ 371 (c)(1),
(2) Date: Oct. 8, 2021

(87) PCT Pub. No.: WO2020/209561
PCT Pub. Date: Oct. 15, 2020

(65) Prior Publication Data
US 2022/0164193 A1 May 26, 2022

(30) Foreign Application Priority Data
Apr. 9, 2019 (KR) .................... 10-2019-0041198

(51) Int. Cl.
*G06F 9/4401* (2018.01)
*G06F 9/451* (2018.01)
(Continued)

(52) U.S. Cl.
CPC ............ *G06F 9/441* (2013.01); *G06F 9/4451* (2013.01); *G06F 9/451* (2018.02); *G06F 21/575* (2013.01)

(58) Field of Classification Search
CPC ........ G06F 9/441; G06F 9/451; G06F 9/4451; G06F 21/575; G06F 9/4555
See application file for complete search history.

(56) References Cited

U.S. PATENT DOCUMENTS

| | | | |
|---|---|---|---|
| 6,066,182 A * | 5/2000 | Wilde | G06F 8/61 717/175 |
| 6,446,260 B1 | 9/2002 | Wilde | |

(Continued)

FOREIGN PATENT DOCUMENTS

| | | | | |
|---|---|---|---|---|
| CN | 109542524 A * | 3/2019 | | G06F 9/4406 |
| KR | 20010092447 A | 10/2001 | | |

(Continued)

OTHER PUBLICATIONS

International Search Report and Written Opinion of the International Searching Authority in connection with International Application No. PCT/KR2020/004634 dated Jul. 27, 2020, 9 pages.

*Primary Examiner* — Jaweed A Abbaszadeh
*Assistant Examiner* — Hyun Soo Kim

(57) ABSTRACT

Disclosed is an electronic device comprising processor connected to a memory. The memory is configured to store a control application, a preferences file and an operating system image for executing a second operating system. The processor is configured to execute the control application in a first operating system. The processor is configured to determine whether preferences of the operating system image satisfy a defined condition in the control application The processor is also configured to change the preferences of the operating system image by using the preferences file when the preferences of the operating system image do not (Continued)

satisfy the defined condition. The processor is further configured to copy, to the operating system image, a package file for allowing the control application to control an operation of the second operating system.

18 Claims, 13 Drawing Sheets

(51) Int. Cl.
*G06F 9/445* (2018.01)
*G06F 21/57* (2013.01)

(56) References Cited

U.S. PATENT DOCUMENTS

| | | | |
|---|---|---|---|
| 7,600,005 | B2 | 10/2009 | Jamkhedkar et al. |
| 8,869,074 | B2 | 10/2014 | Lim et al. |
| 9,348,633 | B2 | 5/2016 | Galicia et al. |
| 10,310,905 | B2 | 6/2019 | Kim et al. |
| 2007/0118654 | A1 | 5/2007 | Jamkhedkar et al. |
| 2011/0016299 | A1 | 1/2011 | Galicia et al. |
| 2012/0042159 | A1* | 2/2012 | Liu ................. G06F 9/4401 713/2 |
| 2012/0309464 | A1 | 12/2012 | Lim et al. |
| 2014/0033188 | A1* | 1/2014 | Beavers ................. G06F 8/65 717/170 |
| 2016/0371124 | A1* | 12/2016 | Kim ................. G06F 9/45558 |

FOREIGN PATENT DOCUMENTS

| | | |
|---|---|---|
| KR | 20120116771 A | 10/2012 |
| KR | 20140043167 A | 4/2014 |
| KR | 20160149922 A | 12/2016 |

\* cited by examiner

ELECTRONIC DEVICE FOR EXECUTING HETEROGENEOUS OPERATING SYSTEMS AND METHOD THEREFOR

CROSS-REFERENCE TO RELATED APPLICATIONS

This application is a 371 of International Application No. PCT/KR2020/004634, filed Apr. 6, 2020, which claims priority to Korean Patent Application No. 10-2019-0041198, filed Apr. 9, 2019, the disclosures of which are herein incorporated by reference in their entirety.

BACKGROUND

1. Field

Embodiments of the disclosure relates to a technology for executing different operating systems.

2. Description of Related Art

Various types of electronic devices including a mobile device are being distributed. As the electronic devices are widely distributed, types of operating systems (OS) for operating the electronic devices are also continuously increasing. In addition to ANDROID™ of GOOGLE™ and IOS™ of APPLE™, TIZEN™ of SAMSUNG ELECTRONICS™ and INTEL™, UBUNTU™ of LINUX, FIREFOX OS™ of MOZILLA™, WINDOWS MOBILE™ of MICROSOFT™, and the like have been released.

Also, with the development of networks, a distributor of an operating system may distribute an operating system image in the form of an image file (e.g., '.iso') on the Internet, and a user of an electronic device may install the operating system image in a memory of the electronic device. Accordingly, the number of cases in which various operating systems are executed in an electronic device is increasing.

SUMMARY

An electronic device may generally operate based on one operating system and may execute another operating system by using virtual network computing (VNC) or through rebooting. However, a virtual machine such as VNC may configure an environment in which a plurality of operating systems use the same hardware. For example, the Android operating system and Linux may share and use a graphics processing unit (GPU) through a virtual machine.

Accordingly, the user of the electronic device may additionally install variously distributed operating systems in the electronic device operating based on a main operating system and may use an application program executable based on an operating system different from the main operating system.

However, when a heterogeneous operating system is executed based on the main operating system, the heterogeneous operating system should be executed based on the main operating system, and a condition for interlocking with the main operating system should be satisfied. When the heterogeneous operating system does not satisfy the above condition, it is difficult for the user to execute the heterogeneous operating system with the distributed operating system image.

An electronic device according to an embodiment of the disclosure may include a memory that stores a control application and a preferences file, and a processor that is operatively connected with the memory and executes the control application in a first operating system. The memory may further store an operating system image for executing a second operating system. The memory may store instructions that cause the processor to determine whether preferences of the operating system image satisfy a condition defined in the control application, to change the preferences of the operating system image by using the preferences file when the preferences of the operating system image do not satisfy the defined condition, and to copy, to the operating system image, a package file for allowing the control application to control an operation of the second operating system.

Also, a method according to an embodiment of the disclosure may include executing a control application based on a first operating system installed on an electronic device, receiving a user input of selecting an operating system image for executing a second operating system, determining whether preferences of the operating system image satisfy a condition defined in the control application, changing the preferences of the operating system image by using the preferences file when the preferences of the operating system image do not satisfy the defined condition, and copying, to the operating system image, a package file for allowing the control application to control an operation of the second operating system.

Also, a storage medium according to an embodiment of the disclosure may store a computer program performing a method that includes executing a control application based on a first operating system installed on an electronic device, receiving a user input of selecting an operating system image for executing a second operating system, determining whether preferences of the operating system image satisfy a condition defined in the control application, changing the preferences of the operating system image by using the preferences file when the preferences of the operating system image do not satisfy the defined condition, and copying, to the operating system image, a package file for allowing the control application to control an operation of the second operating system.

According to embodiments of the disclosure, in the case where an operating system image for installing a heterogeneous operating system is unable to run on an operating system installed on an electronic device, the electronic device may modify the operating system image such that a user executes the heterogeneous operating system simply.

Besides, a variety of effects directly or indirectly understood through this disclosure may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, the same or similar components will be marked by the same or similar reference signs.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
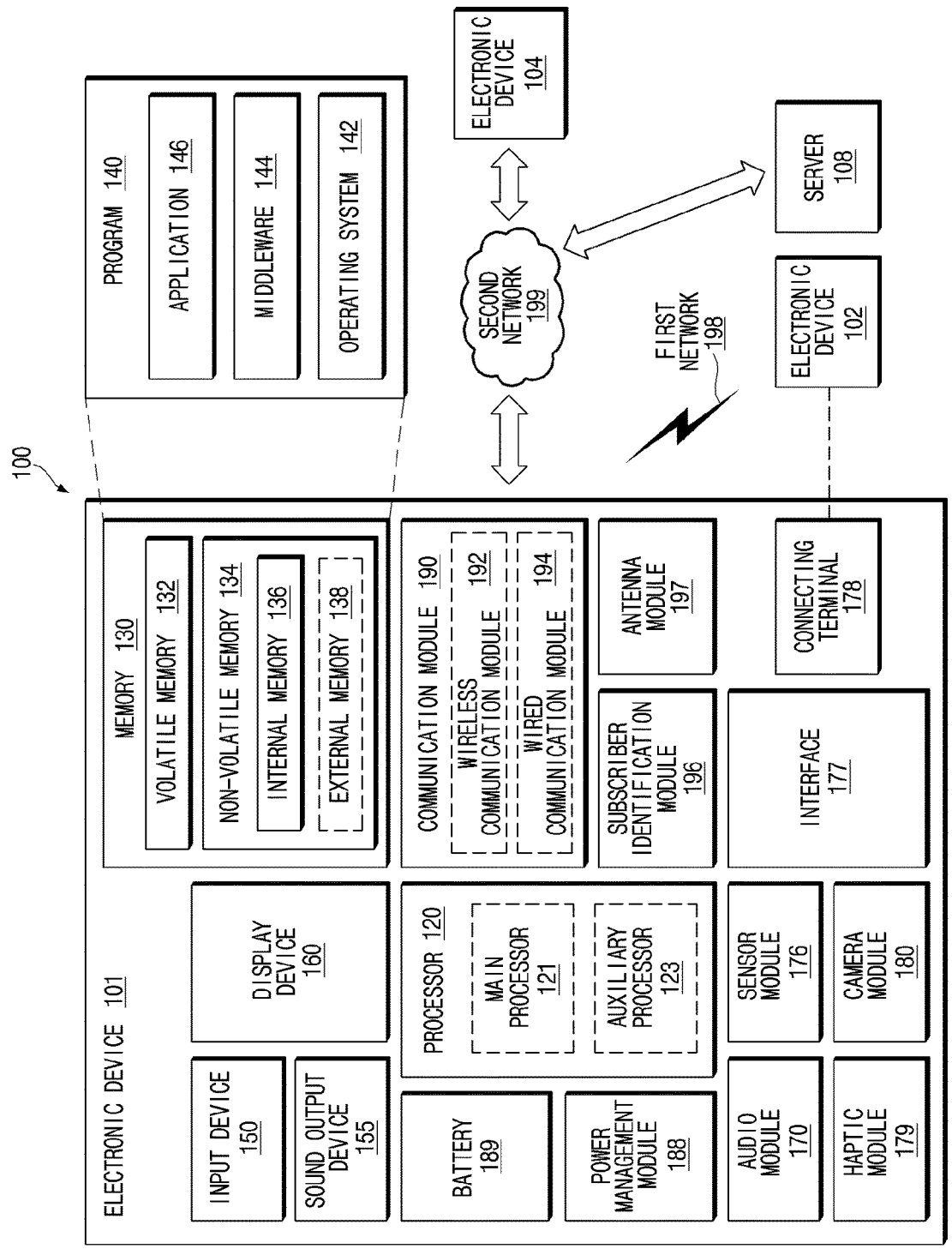
FIG. 1 illustrates an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
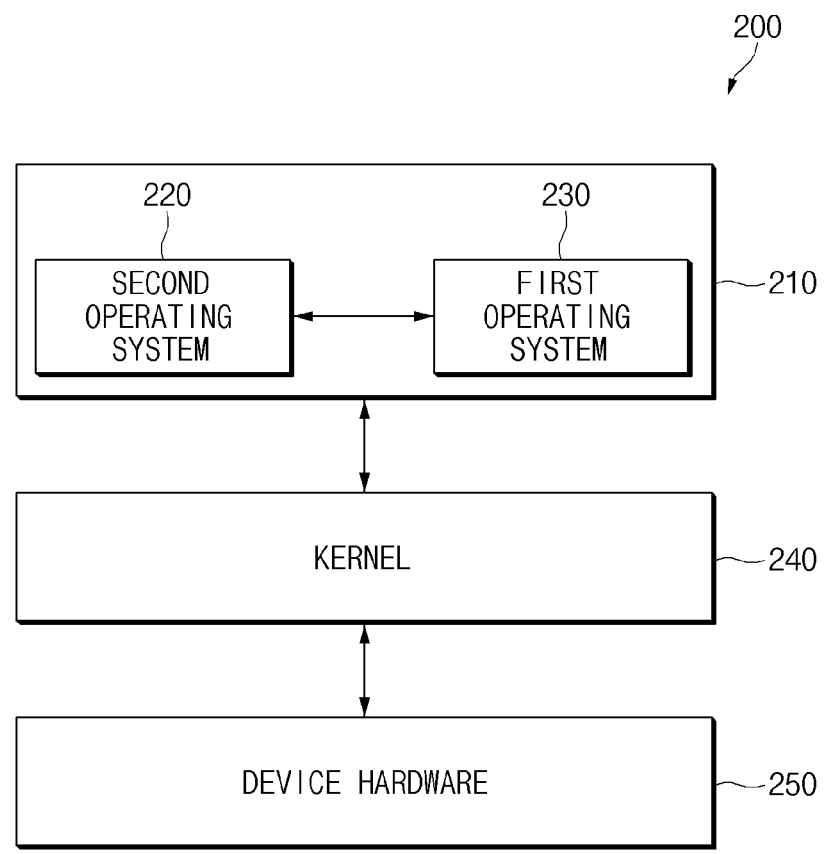
FIG. 2 illustrates a diagram of example components of an electronic device for controlling execution of a heterogeneous operating system according to various embodiments of the disclosure, according to an embodiment.

FIG. 2 illustrates a diagram 200 of example components of an electronic device for controlling execution of a heterogeneous operating system according to various embodiments of the disclosure, according to an embodiment.

An electronic device (e.g., the electronic device 101 of FIG. 1) may include an operating system (OS) 210 and may execute a plurality of operating systems at the same time. The operating system 210 may include a first operating system 230 and a second operating system 220. For example, the first operating system 230 may be an embedded environment intended to be used in the electronic device, for example, the Android operating system, and the second operating system 220 may be the Linux operating system. The second operating system 220 may include Ubuntu® for the Linux-based operating system. In the specification, the first operating system 230 may be referred to as a "host operating system", and the second operating system 220 may be referred to as a "guest operating system".

The first operating system 230 and the second operating system 220 may operate independently of each other and may coexist; in the case of operating based on the Linux, the first operating system 230 and the second operating system 220 may be interdependent. The first operating system 230 and the second operating system 220 of the operating system 210 may communicate with a kernel 240 and may communicate with each other as expressed by arrows. In the embodiment of the disclosure, the Android and the Linux are described as an example of an operating system capable of being included in the operating system 210, but various types of different operating systems including the Android and the Linux may be added or may be used instead. Accordingly, the operating system 210 may include various kinds of two or more operating systems, and a plurality of operating systems may communicate with the same kernel 240 (or any other cores/kernels).

The second operating system 220 may be driven by using an operating system image distributed from a distributor of the second operating system 220. The operating system image may be stored in a memory (e.g., the memory 130) in the form of an ISO image file and may mean, for example, an object configured to drive the second operating system 220. However, the form of the object for driving the second operating system 220 is not limited to the form of an image file. In the specification, for convenience of description, the object configured to drive the second operating system 220 may be referred to as an "operating system image".

The kernel 240 may allocate resources of the electronic device by connecting and managing interactions between physical components of device hardware 250 and individual middleware of the first operating system 230 and the second operating system 220 of the operating system 210.

The device hardware 250 may include various hardware devices. The device hardware 250 may refer to devices coupled to a processor (e.g., the processor 120 of FIG. 1) configured to perform various functions and operations (or computations). For example, the device hardware 250 may include a memory coupled to a processor (e.g., the processor 120 of FIG. 1), and the memory (e.g., the memory 130 of FIG. 1) may store computer-executable instructions configured to perform various functions and operations for controlling execution of a heterogeneous operating system. According to various embodiments, the electronic device may execute the second operating system by using the operating system image stored in the memory (e.g., the memory 130 of FIG. 1). The processor may execute the instructions stored in the memory to process data such that an operation of the electronic device is performed or to control components of the electronic device.

Figure 3:
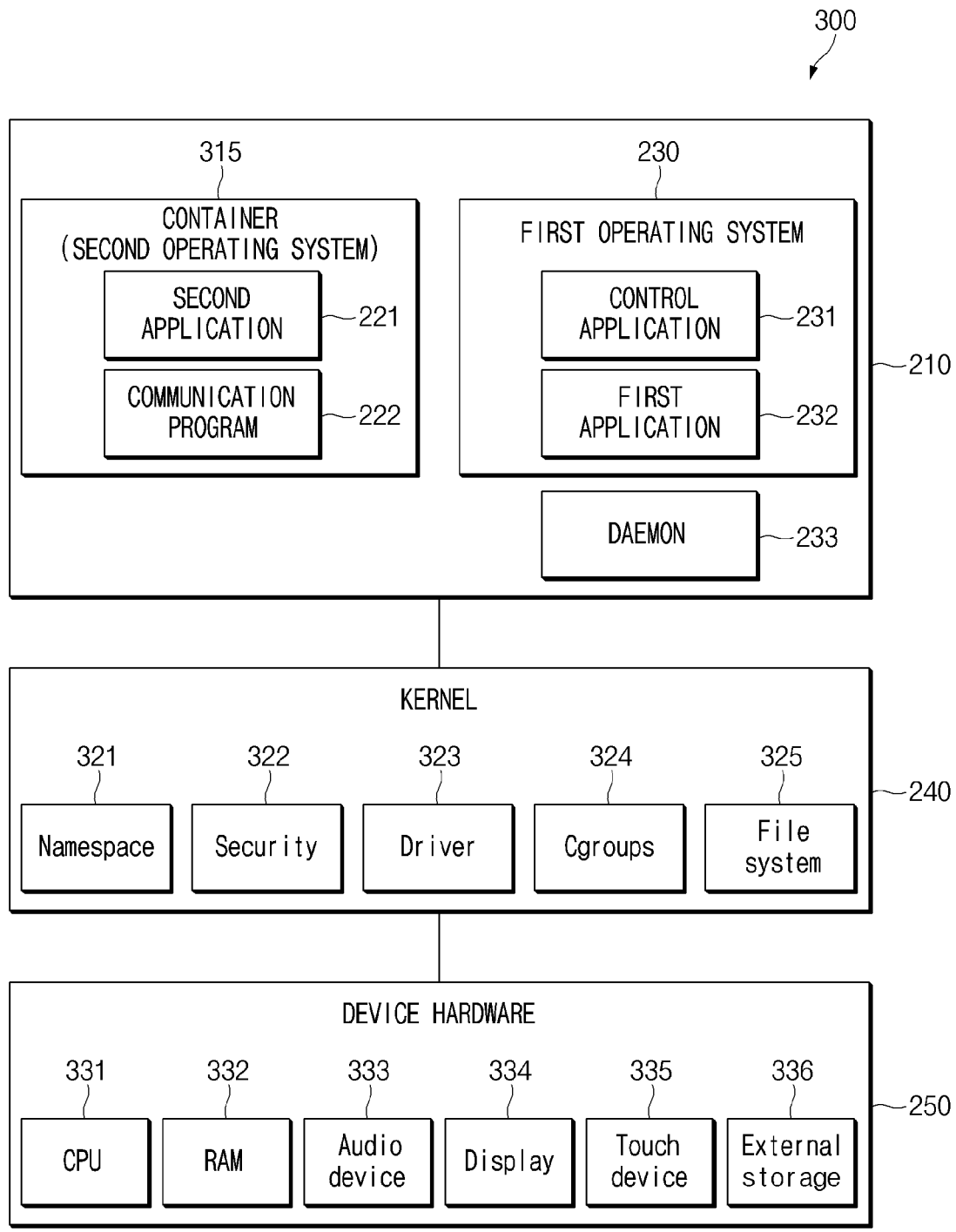
FIG. 3 illustrates a diagram showing an example of detailed components of an electronic device for controlling execution of a heterogeneous operating system according to various embodiments.

FIG. 3 illustrates a diagram 300 showing an example of detailed components of an electronic device for controlling execution of a heterogeneous operating system according to various embodiments. However, FIG. 3 is for describing one example, and the electronic device may further include any other functions or components or may not include some components.

The electronic device (e.g., the electronic device 101 of FIG. 1) may include the operating system 210 including a plurality of operating systems, the kernel 240, and the device hardware 250. The operating system 210 may include a plurality of heterogeneous operating systems. For example, the operating system 210 may include the first operating system 230 and the second operating system (e.g., the second operating system 220 of FIG. 2) as illustrated in FIG. 2.

According to various embodiments, the first operating system 230 may be an Android-based operating system and may include a control application 231 and a first application 232. Here, the first application 232 that is at least one application capable of operating in the Android operating system may be referred to as an "application program". For example, the first application 232 may include various applications, which are capable of operating based on the Android operating system, such as a video play application and a web browser application.

In the specification, the first operating system 230 that is a main operating system operating when the electronic device is booted up may be referred to as a "host operating system" or a "main operating system". The first operating system 230 may execute the control application 231 for the management of a system resource and the interaction with a guest operating system being one or more other operating systems.

According to various embodiments, the first operating system 230 may include the control application 231 for processing and control associated with data based on the first operating system 230 and data based on an operating system (the second operating system (e.g., the second operating system 220 of FIG. 2)) different from the first operating system 230. For example, when the first operating system 230 is the Android operating system and the second operating system is the Linux operating system, the control application 231 may perform the processing and control associated with data based on the Android operating system and data based on the Linux operating system.

According to various embodiments, the control application 231 may communicate with a process of a running guest operating system (e.g., the second operating system) through a container 315 using the kernel 240 of the first operating system 230. The control application 231 may execute or control a process by transferring an event, which occurs in a process of the guest operating system, to a process of the first operating system 230 (e.g., the Android operating system) or transferring an event, which occurs in a process of the first operating system 230, to the guest operating system. According to an embodiment, the control application 231 may be referred to as a "Linux on dex (LoD)" application.

According to various embodiments, the guest operating system (the second operating system) may include a plurality of applications (e.g., a second application 221) that are executed through the container 315 and are capable of operating in the guest operating system. Also, the guest operating system that is executed through the container 315 may include at least one communication program 222. The communication program 222 that is a component for communication with the first operating system 230 may perform communication with the control application 231. For example, the communication program 222 may transmit data associated with the guest operating system executed in the container 315 to the outside (e.g., the control application 231 of the first operating system 230) of the container by using socket communication. As such, the first operating system 230 may obtain, from the communication program 222, data associated with the guest operating system isolated and operated by using the container 315 and may process a process associated with the guest operating system based on the obtained data associated with the guest operating system.

According to various embodiments, the operating system 210 or the first operating system 230 may include a daemon 233 in a multi-tasking operating system. The daemon 233 according to an embodiment may be referred to as a "namespace tool (NST) daemon". The daemon 233 may be a program that operates in the background of the electronic device for the control application 231. The daemon 233 may communicate with the control application 231 and may support the following operation process in addition to the creation of the container 315 for executing the guest operating system: a control for various functions of the kernel 240 such as a namespace 321 and a Cgroups 324 and a mount control of a file system 325. Also, the daemon 233 may support an operation process of the guest operating system without terminating a process of the host operating system.

An embodiment in which the daemon 233 is independent of the container 315 associated with a second operating system being the guest operating system and the first operating system 230 and is included in the operating system 210 is illustrated in FIG. 3 only as an example, and the disclosure is not limited thereto. For example, because the daemon 233 uses the kernel 240 of the first operating system 230, the daemon 233 may correspond to a layer higher than the kernel 240 in a software hierarchical structure, and the layer of the daemon 233 is not limited thereto.

When the first operating system 230 intends to execute the second operating system (e.g., the second operating system 220 of FIG. 2) by using the operating system image, the processor of the electronic device may transfer a message for requesting the daemon 233 to mount the operating system image. According to an embodiment, the message may include a message for confirming whether the operating system image is an image capable of being used by the control application 231. The information on whether the operating system image is available may be returned to the processor as a response to the message. According to an embodiment, when the operating system image is formed of a mountable format, the daemon 233 may return a result indicating that a mounting operation is successfully completed, as the information on whether the operating system image is available. When the operating system image is mounted by the daemon 233, the second operating system may be driven as a virtual operating system by using the container 315. However, for the second operating system to run together with the first operating system 230 by using container 315, the control application 231 should be able to access the second operating system installed by the operating system image. For example, in a state where the Android operating system is running as the first operating system 230, to drive the second operating system that is based on the Linux, the control application 231 running based on the first operating system 230 should be able to access a file system that is based on the second operating system, and should be able to process an operation such as an input/output based on the second operating system.

However, preferences (or preference settings) for operating system images distributed by various distributors may be variously configured, and a package (e.g., a package for controlling an input/output of an operating system) installed in an operating system may be differently configured. Accordingly, it may be impossible to execute the second operating system normally by using the container 315.

Accordingly, according to an embodiment, the electronic device may determine whether preferences of an operating system image for executing the second operating system satisfy a condition defined in the control application 231. For example, when an operating system image is mounted by the daemon 233, the electronic device may determine whether a user ID (UID) and a group ID (GID) of the authority of a root path of the operating system image is included in a region that the control application 231 defines. When the specified condition is satisfied, the electronic device may determine that the user ID and the group ID are included in the region that the control application 231 defines. In more detail, the specified condition may be that at least one of the UID and the GID is a multiple of "65536" and the last five digits of a decimal number are "0".

When the preferences of the operating system image do not satisfy the condition defined in the control application 231, the electronic device may change preferences of the operating system image based on a preferences file stored in a memory (e.g., the memory 130 of FIG. 1). The preferences file may be a file including setting values of an operating system image, which is to be configured for the execution of the operating system image. For example, the electronic device may change an UID and a GID of a subfolder(s) and files, including the root path for the operating system image, so as to satisfy a specified condition. When a first operating system is an Android operating system and a second operating system is a Linux-based operating system, setting the last five digits of the UID and the GID of the root path "0", IDs of the Android operating system and IDs of the Linux-based operating system may be visually easily matched. The control application 231 may define and use "1638400000" as a basic UID.

According to an embodiment, the preferences file may include information that allows a range of a user ID for root authority control to be allocated within a container 315. Also, according to an embodiment, the preferences file may allow the electronic device to allocate an SE Android™ domain for access authority control to be allocated within a container 315. Also, the preferences file may allow the electronic device to set a device pseudo terminal that the second operating system uses for connection with an input/output device. Also, the preferences file may allow the electronic device to set a script file for executing the second operating system in the container 315. When user ID range allocation, domain allocation, device pseudo terminal setting, and script file setting are completed, the electronic device may execute the second operating system in a command line interface (CLI) mode.

Here, to execute the second operating system with a graphic user interface (GUI), it is further necessary to install a package for preferences of the graphic user interface. Accordingly, in this case, the preferences file may allow an electronic device to set a software repository for package installation and to update the package for preferences of the graphic user interface with respect to the operating system image.

Also, the electronic device may copy, into the operating system image, a package file for allowing the control application 231 to operate the second operating system 220. For example, the electronic device may copy, into the operating system image, at least one of 1) an installation file of a program package operating in the second operating system 220, 2) an executable file for the second operating system to communicate with the control application 231, 3) a package file for installing a program that allows the second operating system to control a screen through the control application 231; 4) a shell script file allowing the second operating system to perform a specified operation, or 5) a package file allowing the second operating system to output a sound through the control application 231. The file copied to the operating system image may be stored at a specified location of the electronic device or may be downloaded from an external server.

According to various embodiments, the electronic device may use the container 315 to simultaneously execute the second operating system and the first operating system 230 based on the mounted operating system image. According to an embodiment, the container 315 may be created by the control application 231. Also, the processor of the electronic device (e.g., the processor 120 of FIG. 1) may allow the first operating system 230 to create the container 315. Under control of the processor, there may be created the container 315 for executing the second operating system, which is the guest operating system, by using the control application 231 installed in the first operating system 230. According to an embodiment, when a user command that requires the execution of the second operating system is input, the processor may create the container 315. For example, when the user selects (e.g., double-clicks) an icon for executing an application executable based on the second operating system, the processor may create the container 315 for executing the second operating system.

According to various embodiments, the electronic device may allocate a container created to execute a heterogeneous operating system based on the host operating system as the container 315 for executing the second operating system.

According to various embodiments, the control application 231 may execute the second operating system through the container 315 (or the specific container). Accordingly, the electronic device may not allocate or store the following data in advance for management: all data necessary for an application operating based on the second operating system as well as data for driving the second operating system. Instead, the electronic device may enable simultaneous execution of a heterogeneous operating system by creating the container 315 in response to receiving a user input for driving the second operating system and then allocating data necessary for the second operating system to the container 315 thus created.

According to various embodiments, through the container 315, the control application 231 may allocate and provide data necessary to execute an application (e.g., the second application 221) that is based on the second operating system.

According to various embodiments, the container 315 may be created by using an isolation technology rather than virtualization. For example, when the first operating system 230 is running, the container 315 may process only a process of the second operating system without a booting process for executing the second operating system. Accordingly, because the control application 231 of the first operating system 230 is capable of managing and distributing an image in units of file through the container 315, it may be possible to simultaneously execute an operating system different from the currently running operating system with a minimum capacity. In addition, the container 315 according to various embodiments of the disclosure may use the kernel 240 of the first operating system 230 being the host operating system and may allocate only a memory necessary for an application executed based on the second operating system. As such, it may be possible to overcome the limitation of virtualization of the virtual machine, and thus, the heterogeneous operating system may be controlled without overhead for the performance of the host operating system.

According to various embodiments, the kernel 240 may be executed as the Linux kernel of the first operating system 230 (e.g., the Android operating system), and may create the container 315 having a Linux container function so as for the control application 231 to drive the guest operating system (e.g., the Linux operating system). The kernel 240 may be a program that provides various functions for executing an operating system. For example, the kernel 240 may include at least one of a namespace function 321 for allocating a process for executing a guest operating system associated with the first operating system 230 to a namespace, a security function 322, a driver function 323 for accessing components of the device hardware 250 of the electronic device, a control groups (Cgroups) function 324 for resource allocation, which is used to allocate a CPU core or memory capacity that the guest operating system is capable of using, or a file system function 325 of for storing and managing files.

According to various embodiments, the container 315 may be an environment for driving a virtual operating system independently of the first operating system 230, and the Linux operating system running in the container 315 may be a Linux distribution, which is made based on a kernel supporting Linux containers, such as Ubuntu™ or Debian. Meanwhile, the creation of the container 315 is not limited to the components illustrated in FIG. 3, and the container 315 may be created by using a Linux namespace container.

According to various embodiments, the device hardware 250 may include at least one hardware component and may include a processor (e.g., a CPU 331) and a memory (e.g., a RAM 332). The device hardware 250 may additionally include any other input devices (e.g., a touch device 335) such as a keyboard, a mouse, and/or a touch screen, an audio device 333, an output device such as a speaker and/or a display 334, or various other components and resources such as external storage 336.

Figure 4:
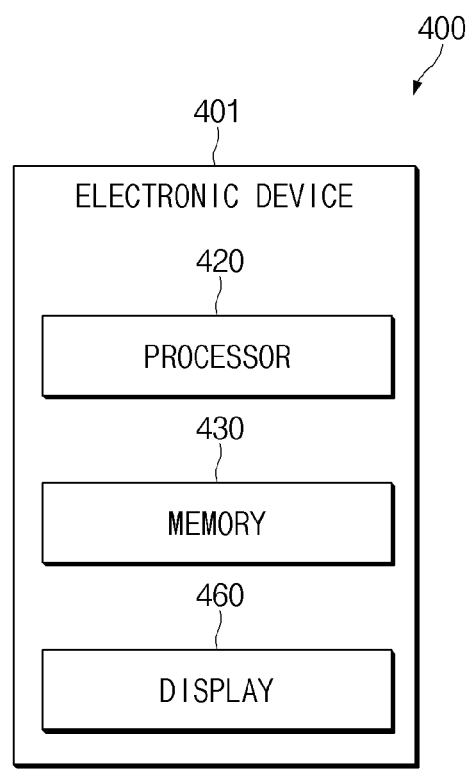
FIG. 4 illustrates a diagram of an internal structure of an electronic device for controlling execution of a heterogeneous operating system according to various embodiments.

FIG. 4 illustrates a diagram 400 showing an example internal structure of an electronic device for controlling execution of a heterogeneous operating system according to various embodiments.

Referring to FIG. 4, an electronic device 401 (e.g., the electronic device 101 of FIG. 1) which is a device controlling execution of a heterogeneous operating system may include a processor 420 (e.g., the processor 120 of FIG. 1), a memory 430 (e.g., the memory 130 of FIG. 1), and a display 460 (e.g., the display device 160 of FIG. 1). Here, all the components illustrated in FIG. 4 are not essential components of the electronic device 401, and the electronic device 401 may be implemented to include components, the number of which is more than or less than the number of components illustrated in FIG. 4. According to an embodiment, the display 460 may be omitted.

The memory 430 may store instructions that, when executed, cause the processor 420 to perform various operations.

According to various embodiments, the memory 430 may be operatively connected with the display 460 and the processor 420, and may store a plurality of applications including a first application operating based on a first operating system and a second application operating based on a second operating system.

According to various embodiments, the processor 420 may output a screen displaying a user interface provided by the first operating system through the display 460. The user interface provided by the first operating system may output a first object associated with execution of the first application and a second object associated with execution of the second application. When a user input of selecting the second object is received, the processor 420 may allow a background program to mount an operating system image for executing the second operating system. When preferences of the mounted operating system image do not satisfy a condition defined in a control application, the processor 420 may change the preferences of the operating system image by using a preferences file stored in the memory 430. When a package that allows the control application operating based on the first operating system to control an operation of the second operating system is not installed on the mounted operating system image, the processor may copy a package file into the mounted operating system image.

Figure 5:
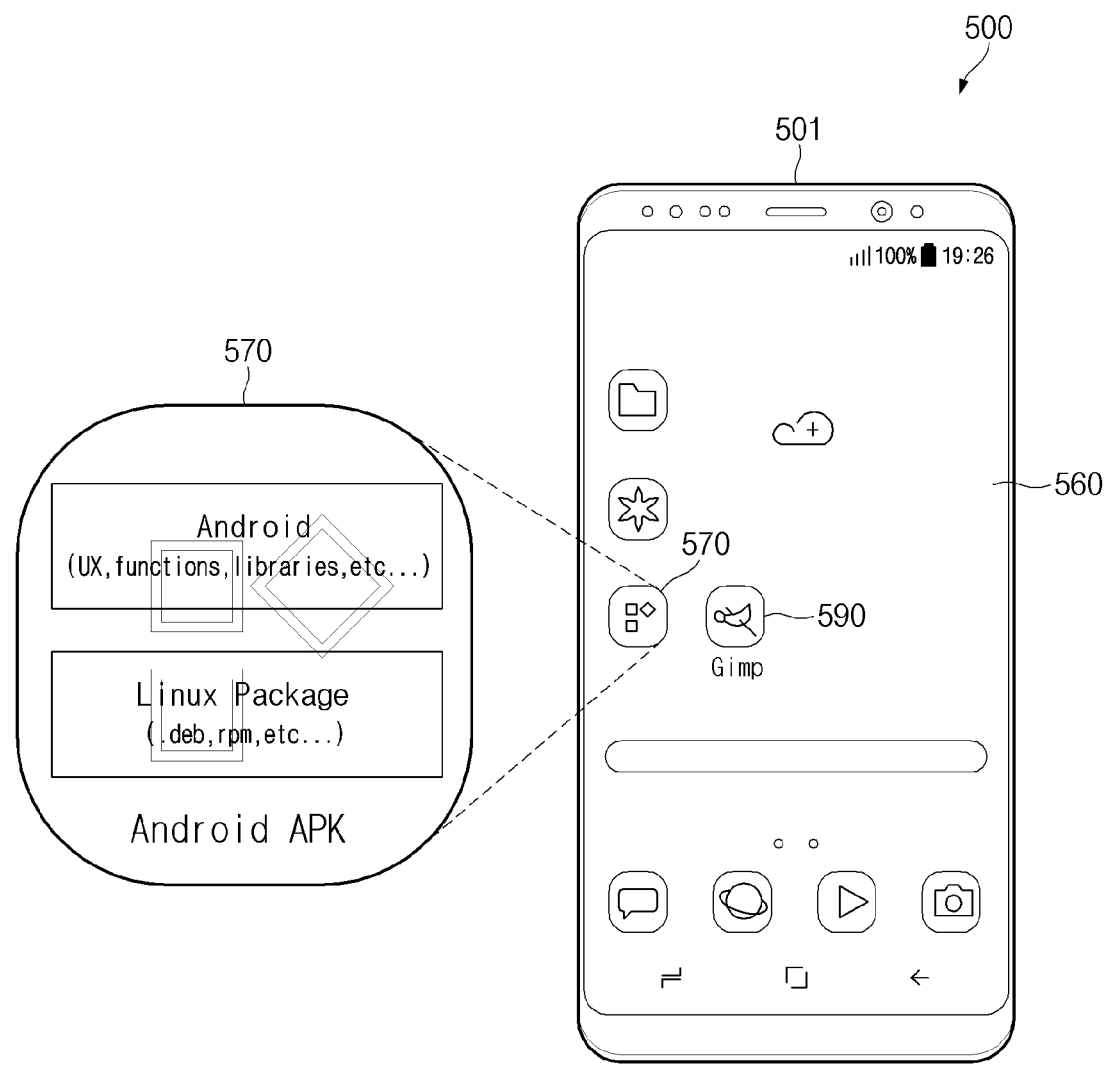
FIG. 5 illustrates a view of an example of a screen for controlling execution of a heterogeneous operating system at an electronic device according to various embodiments.

FIG. 5 illustrates a view of an example of a screen for controlling execution of a heterogeneous operating system at an electronic device according to various embodiments.

An electronic device 501 (e.g., the electronic device 101 of FIG. 1) may output a screen displaying a first user interface provided by a first operating system. The screen displaying the first user interface may be implemented based on graphic data provided from the first operating system. For example, the electronic device 501 may render a main home screen 560 illustrated in FIG. 5 based on the graphic data provided from the first operating system. Also, when the first application is executed based on the first operating system, the electronic device 501 may display, in the first user interface, an execution screen that is output as a result of executing the first application. The main home screen 560 may be the first screen that is displayed on a display (e.g., the display device 160 of FIG. 1 or the display 460 of FIG. 4) when the electronic device 501 is booted up based on the first operating system. Also, the main home screen 560 may be configured to include an object 570 for driving a second operating system different from the first operating system running and an object 590 associated with at least one second application capable of operating based on the second operating system, as well as objects (e.g., icons) associated with the first application capable of operating based on the first operating system.

The electronic device 501 may drive the second operating system in response to user selection associated with the object 570 for driving the second operating system. The electronic device 501 may change preferences of the operating system image for the purpose of driving the second operating system. Also, the electronic device 501 may copy a file for driving the second operating system into the operating system image. When the second operating system is driven, the electronic device 501 may configure a second user interface using data output from the second operating system, by using the control application. The electronic device 501 may display the second user interface in the first user interface. Also, the electronic device 501 may display the second user interface instead of the first user interface.

Figure 6:
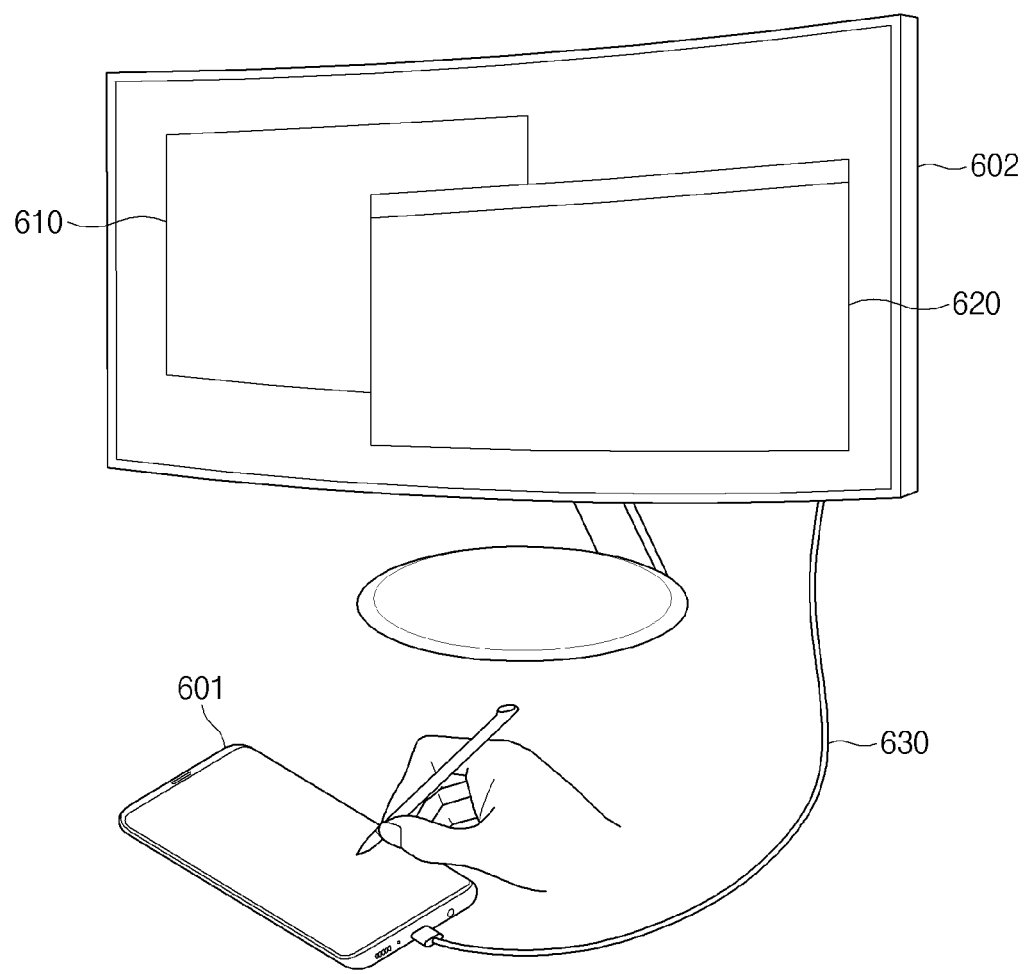
FIG. 6 illustrates a view describing an operating environment of an electronic device according to various embodiments.
Figure 7:
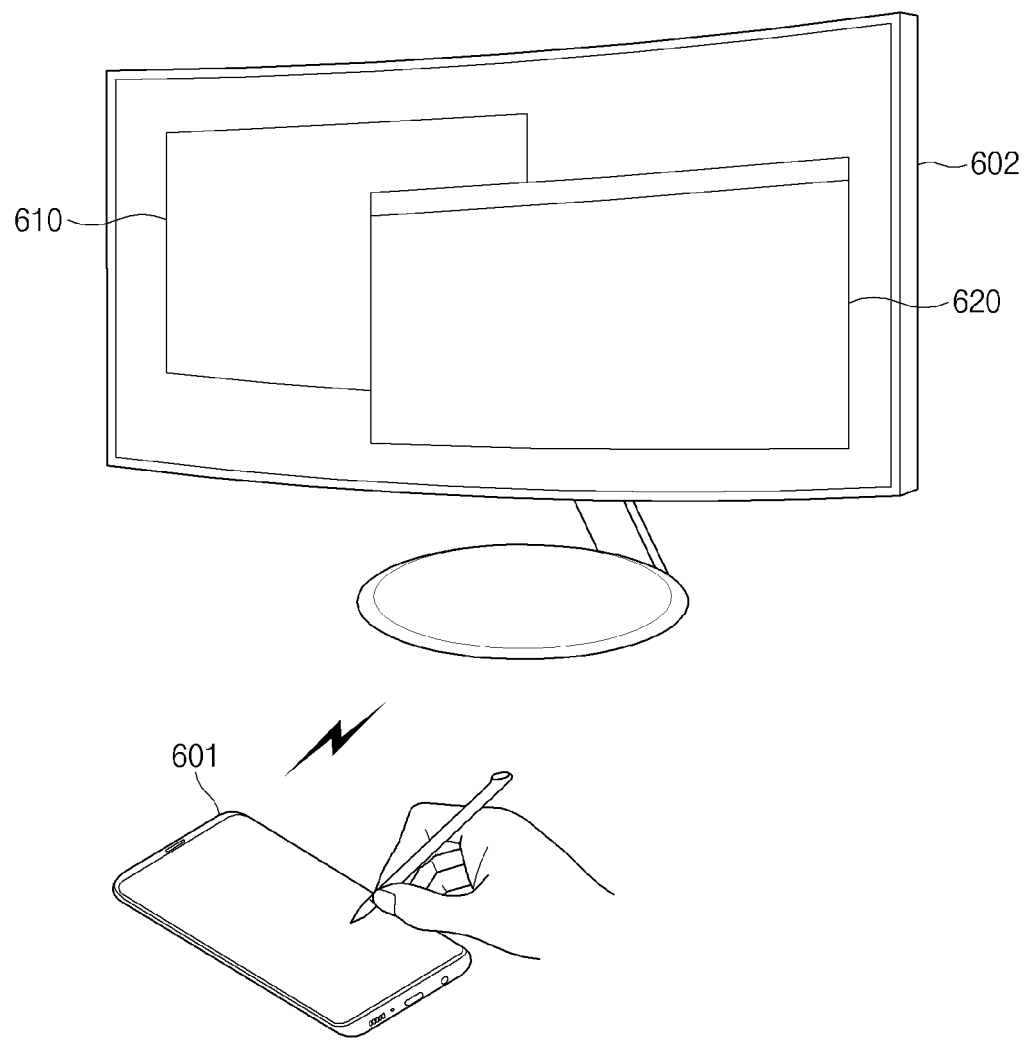
FIG. 7 illustrates a view describing an operating environment of an electronic device according to another embodiment.

FIGS. 6 and 7 illustrate views describing operating environments of an electronic device according to various embodiments.

An electronic device 601 may be connected with an external electronic device 602 (e.g., a display device). The electronic device 601 is a mobile device such as a smartphone, a size of a touch screen display may be limited.

For example, the electronic device 601 may be connected with the external electronic device 602 through an input/output interface such as a USB connector or a USB-C connector. FIG. 6 illustrates an example in which the electronic device 601 is connected with the external electronic device 602 through an input/output interface 630. For example, the electronic device 601 may be connected with the external electronic device 602 through a repeater such as a docking station. For another example, the electronic device may be connected with the external electronic device wirelessly as illustrated in FIG. 7.

When the electronic device 601 is connected with the external electronic device 602, the electronic device 601 may output a screen through the external electronic device 602. The electronic device 601 may reconfigure a screen displayed in the display of the electronic device 601 and may output the reconfigured screen through the external electronic device 602. The electronic device 601 may provide a user interface or a user experience, which is similar to that when using a desktop, to the user through the external electronic device 602.

According to various embodiments, the electronic device 601 may simultaneously execute a plurality of operating systems and may simultaneously display screens of the plurality of operating systems. For example, the electronic device 601 may execute the Android operating system and the Linux operating system at the same time. To display an execution screen of an application, the electronic device 601 may display a first window 610 and/or a second window 620 occupying a partial area or the whole of the screen output through the external electronic device 602.

Also, the electronic device 601 may be wiredly or wirelessly connected with an external input device such as a keyboard or a mouse such a user input is received through the external input device, but the electronic device 601 may receive a user input through a touch screen-type display.

According to various embodiments, the external electronic device 602 may be various external devices capable of connecting to the electronic device 601. For example, the external electronic device 602 may include a desktop, an external monitor, a TV, a laptop, or a tablet PC.

Figure 8:
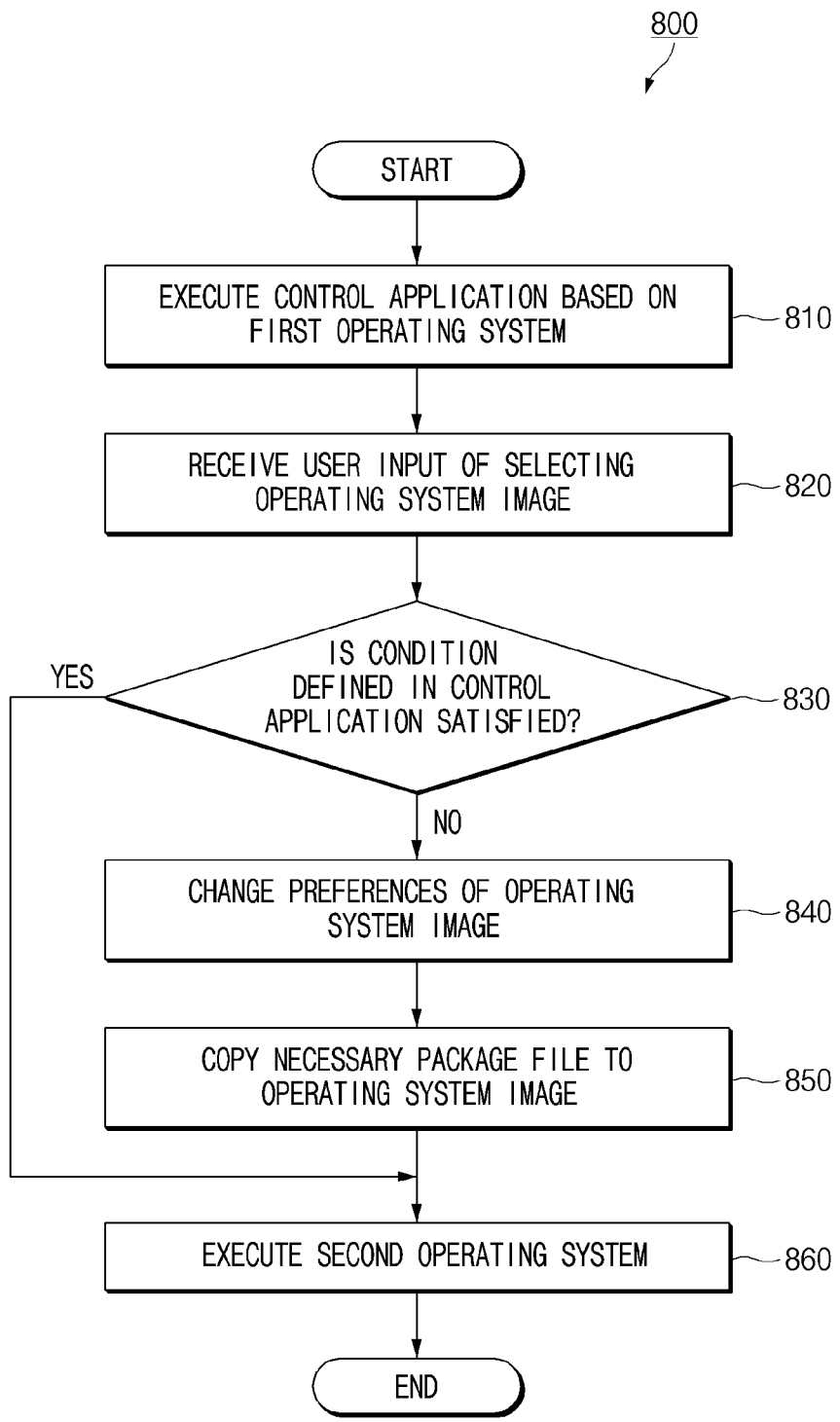
FIG. 8 illustrates a flowchart of a process in which an electronic device according to various embodiments executes a second operating system.

FIG. 8 illustrates a flowchart 800 of a process in which an electronic device (e.g., the electronic device 101 of FIG. 1, the electronic device 501 of FIG. 5, the electronic device 601 of FIG. 6, or the electronic device 601 of FIG. 7) according to various embodiments executes a second operating system.

According to an embodiment, in operation 810, a control application may be executed based on a first operating system. For example, in a state where the electronic device is operating based on the first operating system, when an event that execution of the second operating system being an operating system different in type from the first operating system is required, the electronic device may execute the control application. In more detail, when a command for requesting execution of a second application executable based on the second operating system is input, the electronic device may execute the control application. For another example, when a user input of selecting an object (e.g., an icon or a menu item) for executing the control application is received through a user interface provided by the first operating system, the electronic device may execute the control application.

In operation 820, the electronic device may receive a user input of selecting an operating system image. For example, the electronic device may receive a user input of requesting execution of the second application executable based on the second operating system. For another example, the electronic device may provide an operating system selection user interface for selecting an operating system image in an execution screen of the control application. The electronic device may receive a user input of selecting an operating system image by using the operating system selection user interface.

In operation 830, the electronic device may mount the selected operating system image by using a background program (e.g., the daemon 233 of FIG. 3) supporting a mount control of a file system and may determine whether the operating system image satisfies a condition defined in the control application. When the operating system image satisfies the condition defined in the control application, in operation 860, the electronic device may drive the second operating system by using the operating system image.

When the operating system image does not satisfy the condition defined in the control application, the electronic device may change preferences of the operating system image in operation 840.

For example, when the operating system image is mounted by the daemon (e.g., daemon 233 of FIG. 3), the electronic device may determine whether a user ID (UID) and a group ID (GID) of the authority of a root path of the operating system image is included in a region that the control application defines. When the specified condition is satisfied, the electronic device may determine that the user ID and the group ID are included in the region that the control application defines. In more detail, the specified condition may be that at least one of the UID and the GID is a multiple of "65536" and the last five digits of a decimal number are "0". According to an embodiment, when the operating system image does not satisfy the condition defined in the control application, the electronic device may change the preferences of the operating system image so that the UID and the GID among the authority of a root path of the operating system image are included in the area defined by the control application. According to an embodiment, the electronic device may change UIDs and GIDs for subfolders and files, including the root path to the operating system image, to satisfy a specified condition.

In operation 850, the electronic device may copy, to the operating system image, a package file necessary for the control application to control an operation of the second operating system. For example, the electronic device may copy, to the operating system image, an installation file of a package operating in the second operating system, an executable file for communicating with the control application, and a shell script file performing a specified operation in the second operating system. In operation 860, the electronic device may execute the second operating system by using the operating system image whose preferences are changed and in which the required package is installed.

Figure 9:
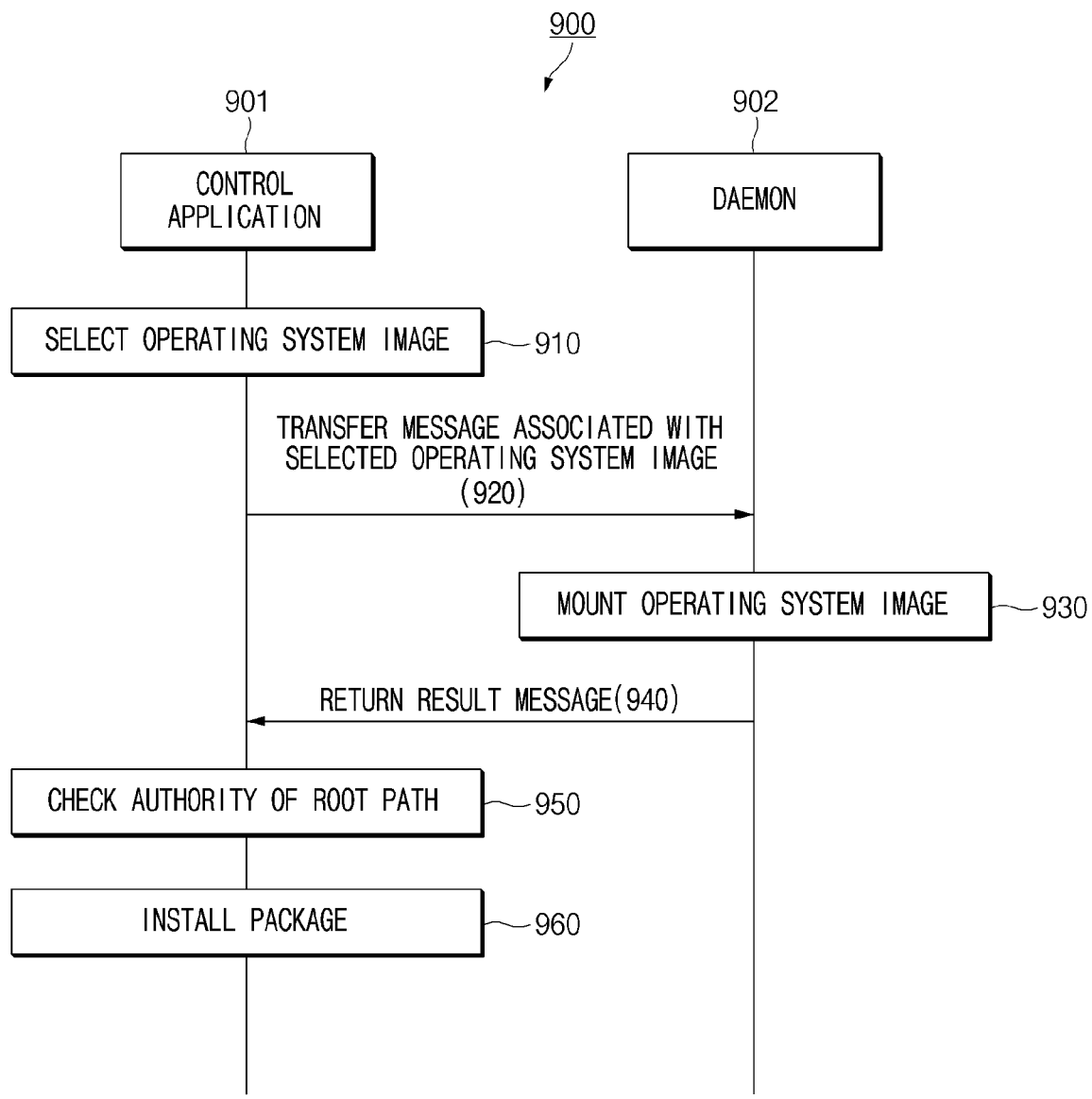
FIG. 9 illustrates a flowchart of a process in which a control application according to various embodiments determines whether an operating system image is an available image and reconfigures the operating system image.

FIG. 9 illustrates a flowchart 900 of a process in which a control application according to various embodiments determines whether an operating system image is an available image and reconfigures the operating system image.

According to an embodiment, in operation 910, a control application 901 (e.g., the control application 231 of FIG. 3)

may select an operating system image stored in an electronic device (e.g., the electronic device 101 of FIG. 1, the electronic device 401 of FIG. 4, the electronic device 501 of FIG. 5, the electronic device 601 of FIG. 6, or the electronic device 601 of FIG. 7). For example, the control application 901 may display a list of operating system images stored in the electronic device through a display and may receive a user input of selecting an operating system image included in the displayed list.

In operation 920, the control application 901 may transfer a message associated with the selected operating system image to a daemon 902 (e.g., the daemon 233 of FIG. 3). Here, the message associated with the selected operating system image may be a message requesting to determine the operating system image is a mountable image and to mount the operating system image when it is determined that the operating system image is capable of being mounted.

In operation 930, the daemon 902 receiving the message may determine whether the operating system image designated by the received message is of a mountable format (e.g., an '.iso' format). When the operating system image is mountable, the daemon 902 may mount the operating system image. In operation 930, the daemon 902 may return a result message associated with a mount operation to the control application 901. The result message associated with the mount operation may be returned to the control application 901 as whether the operating system image is available.

In operation 950, the control application 901 may determine whether the authority of a root path of the mounted operating system image satisfies a specified condition. When it is determined in operation 950 that the authority of the root path of the mounted operating system image does not satisfy the specified condition, the control application 901 may change the authority of the root path and subfolders and files of the root path so as to satisfy the specified condition. According to an embodiment, the specified condition may be defined based on a preferences file stored in a memory of the electronic device.

In operation 960, the control application 901 may determine whether a package file for controlling an operation of the second operating system is included in the operating system image. The control application 901 may copy, into the operating system image, the package file not included in the operating system image.

Figure 10:
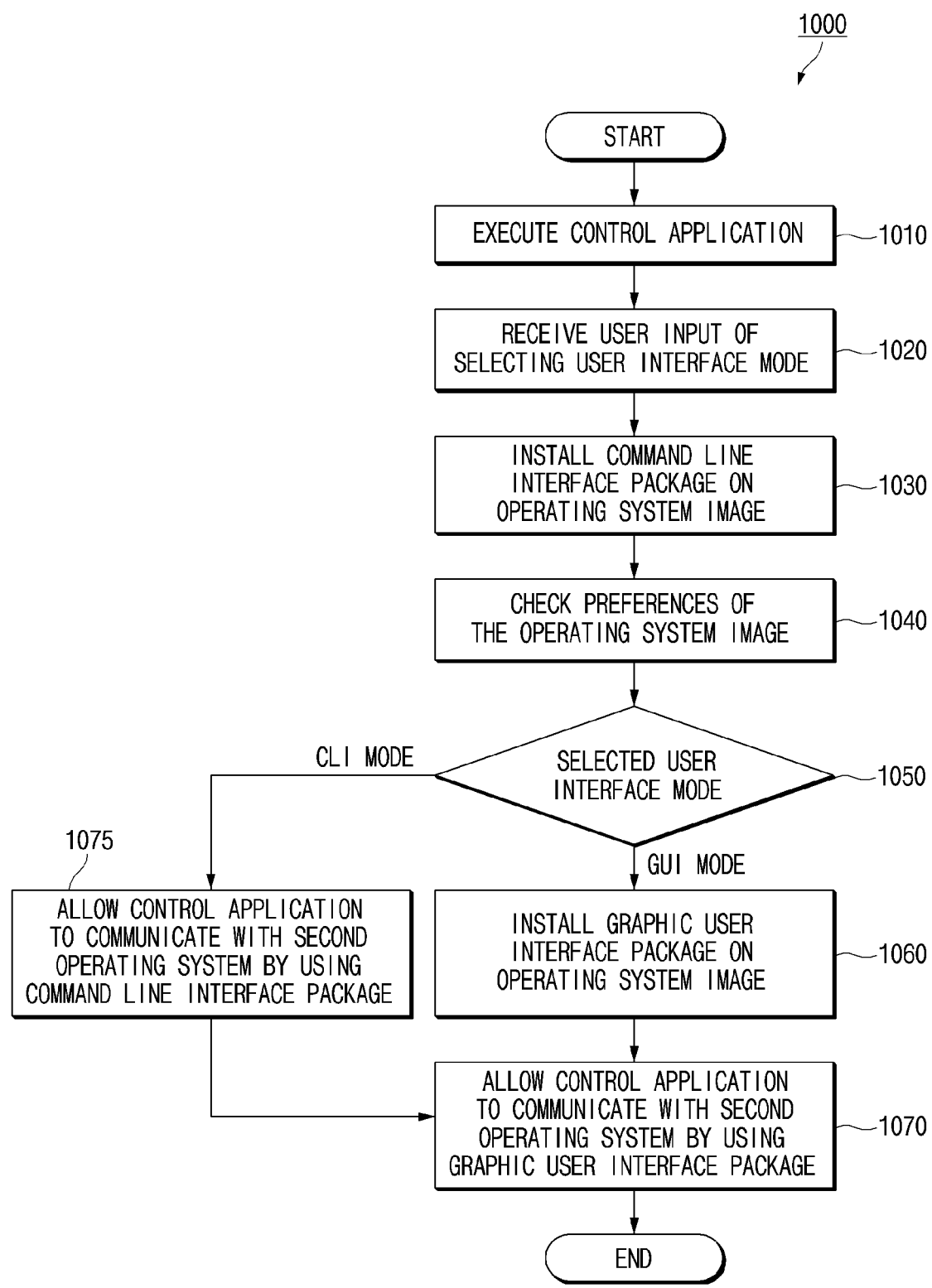
FIG. 10 illustrates a flowchart of a process in which an electronic device according to various embodiments configures an operating system image depending on a user interface mode.

FIG. 10 illustrates a flowchart 1000 of a process in which an electronic device according to various embodiments configures an operating system image depending on a user interface mode.

In operation 1010, an electronic device (e.g., the electronic device 101 of FIG. 1, the electronic device 401 of FIG. 4, the electronic device 501 of FIG. 5, the electronic device 601 of FIG. 6, or the electronic device 601 of FIG. 7) may execute a control application. For example, when an execute command of a program executable based on a second operating system is input while operating based on a first operating system, the electronic device may execute the control application. For another example, when an object (e.g., an icon) allowing the control application to be executed is selected, the electronic device may execute the control application.

In operation 1020, the electronic device may receive a user input of selecting a user interface mode. According to an embodiment, the electronic device may display, through a display, a list of user interface modes available with respect to the second operating system. The electronic device may receive a user input of selecting a user interface mode from the list of the user interface modes thus displayed. A user interface mode may mean a form of a user interface that is provided to the user for interaction of the second operating system and the user. For example, the user interface mode may be a command line interface (CLI) mode or a graphic user interface (GUI) mode.

In operation 1030, the electronic device may install a command line interface package on the operating system image for driving the second operating system. For example, at least one of a teletype writer (TTY) and a pseudo-terminal slave (PTS) is not installed in the operating system image, the electronic device may install a program not installed. In FIG. 10, it is illustrated that operation 1030 is performed after operation 1020, but the disclosure is not limited to the order illustrated in drawing. For example, operation 1030 may be performed prior to operation 1020; alternatively, operation 1030 may be performed in parallel with operation 1020.

In operation 1040, the electronic device may check preferences of the operating system image. According to an embodiment, when the preferences of the operating system image are not included in a range defined by a preferences stored in the electronic device, the electronic device may change the preferences of the operating system image based on the preferences file.

In operation 1050, the electronic device may drive the second operating system depending on the user interface mode selected by the user input. When the selected user interface mode is the GUI mode, in operation 1060, the electronic device may further install a graphic user interface package on the operating system image. For example, when at least one of executable files for installing "PulseAudio" for receiving and playing, at the first operating system, sound data generated in the second operating system and virtual network computing (VNC) for remotely controlling the second operating system is not included in the operating system image, the electronic device may copy a target not included to the operating system image. According to an embodiment, in at least one of operation 1030 and operation 1060, the electronic device may copy a file stored in the electronic device to the operating system image. Alternatively, according to another embodiment, in at least one of operation 1030 and operation 1060, the electronic device may download a required file from a network by using a package management tool and may install the downloaded file on the operating system image.

In operation 1070, the electronic device may allow the control application to communicate with the second operating system by using a graphic user interface package installed on the second operating system. The electronic device may provide a graphical user interface to the user by using the graphic user interface package. For example, the electronic device may output a window 1310 including the graphic user interface illustrated in FIG. 13.

When the selected user interface mode is the CLI mode, in operation 1075, the electronic device may allow the control application to communicate with the second operating system by using a command line interface package. The electronic device may provide a command line interface to the user by using the command line interface package. For example, the electronic device may output a window 1210 including the command line interface illustrated in FIG. 12.

Figure 11:
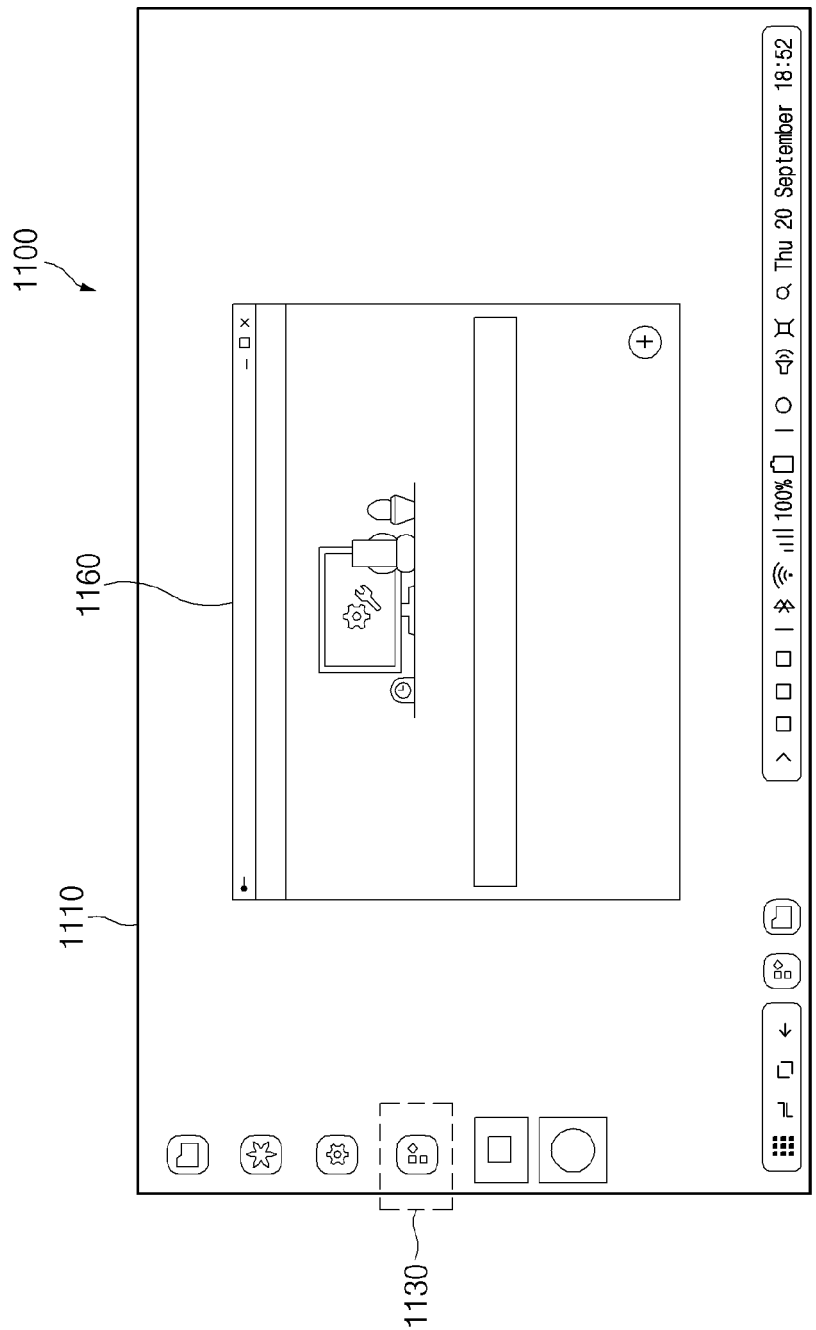
FIG. 11 illustrates an exemplary diagram showing a screen for selecting an object allowing an electronic device according to various embodiments to drive a second operating system.

FIG. 11 illustrates an exemplary diagram showing a screen for selecting an object allowing an electronic device according to various embodiments to drive a second operating system.

FIG. 11 illustrates a main screen 1110 that an electronic device (e.g., the electronic device 101 of FIG. 1, the electronic device 401 of FIG. 4, the electronic device 501 of FIG. 5, the electronic device 601 of FIG. 6, or the electronic device 601 of FIG. 7) outputs through an external electronic device in the case where the electronic device is connected with the external electronic device.

When the connection with the external electronic device (e.g., a monitor) is detected, the electronic device may change an operating mode from a normal mode to an expansion mode. For example, when the operating mode is the expansion mode, the electronic device may execute a DEX program and may display a screen in a display of the external electronic device by using the DEX program. According to an embodiment, when the operating mode is the normal mode, the electronic device may display a screen only in a display device (e.g., the display device 160 of FIG. 1) of the electronic device.

According to an embodiment, the electronic device may display a main screen 1110 having a layout, which is similar in shape to a window of a desktop, in the external electronic device. The electronic device may further display an execution screen of an application through an external display device. For example, when a user input of commanding execution of a web browsing application is received, the electronic device may display a web browsing window 1160 in the main screen 1110. When the user selects an object indicating an application displayed on the main screen 1110, the electronic device may execute the application installed in the electronic device.

Figure 12:
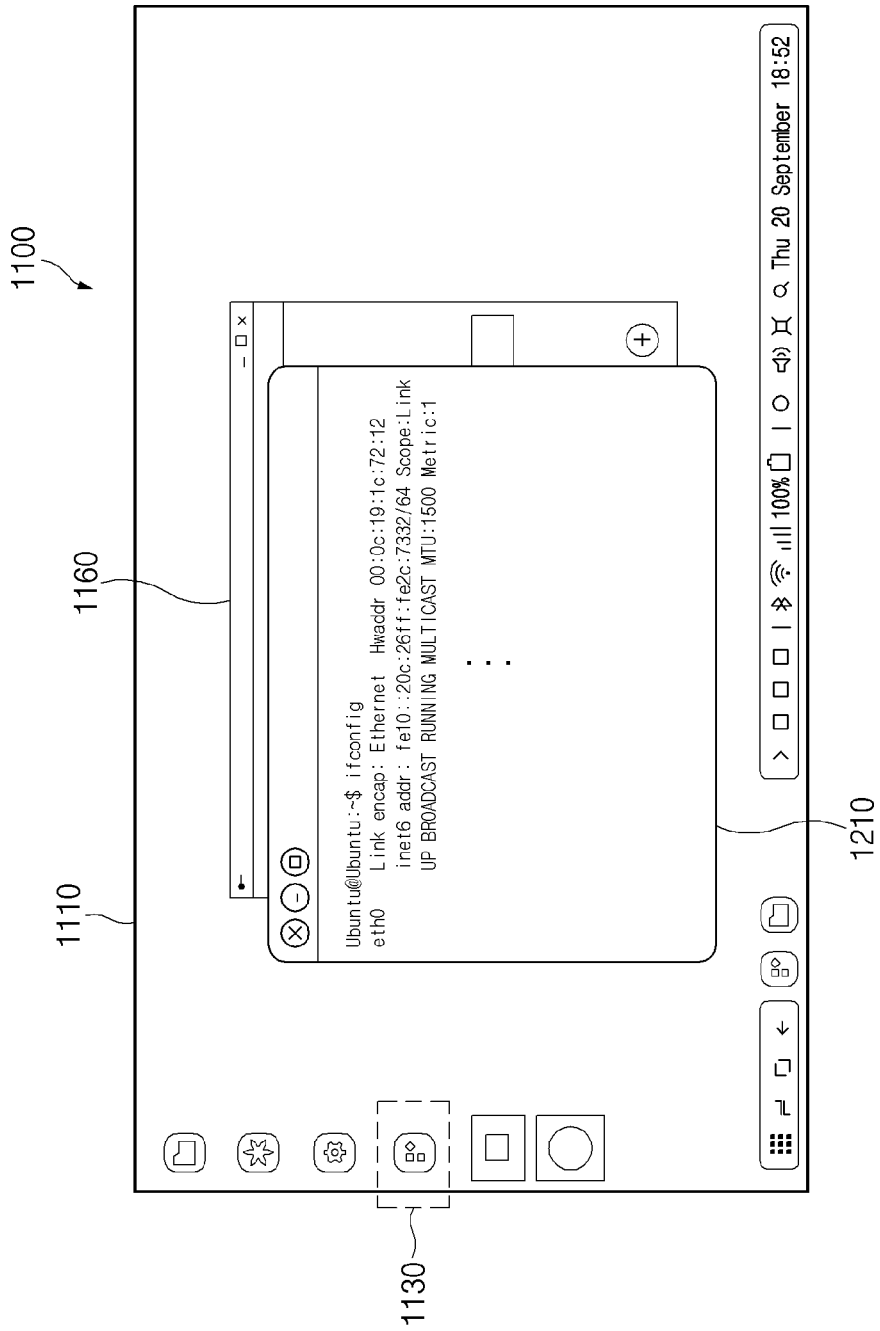
FIG. 12 illustrates an example of a screen output when an electronic device according to various embodiments drives a second operating system in a command line interface mode.
Figure 13:
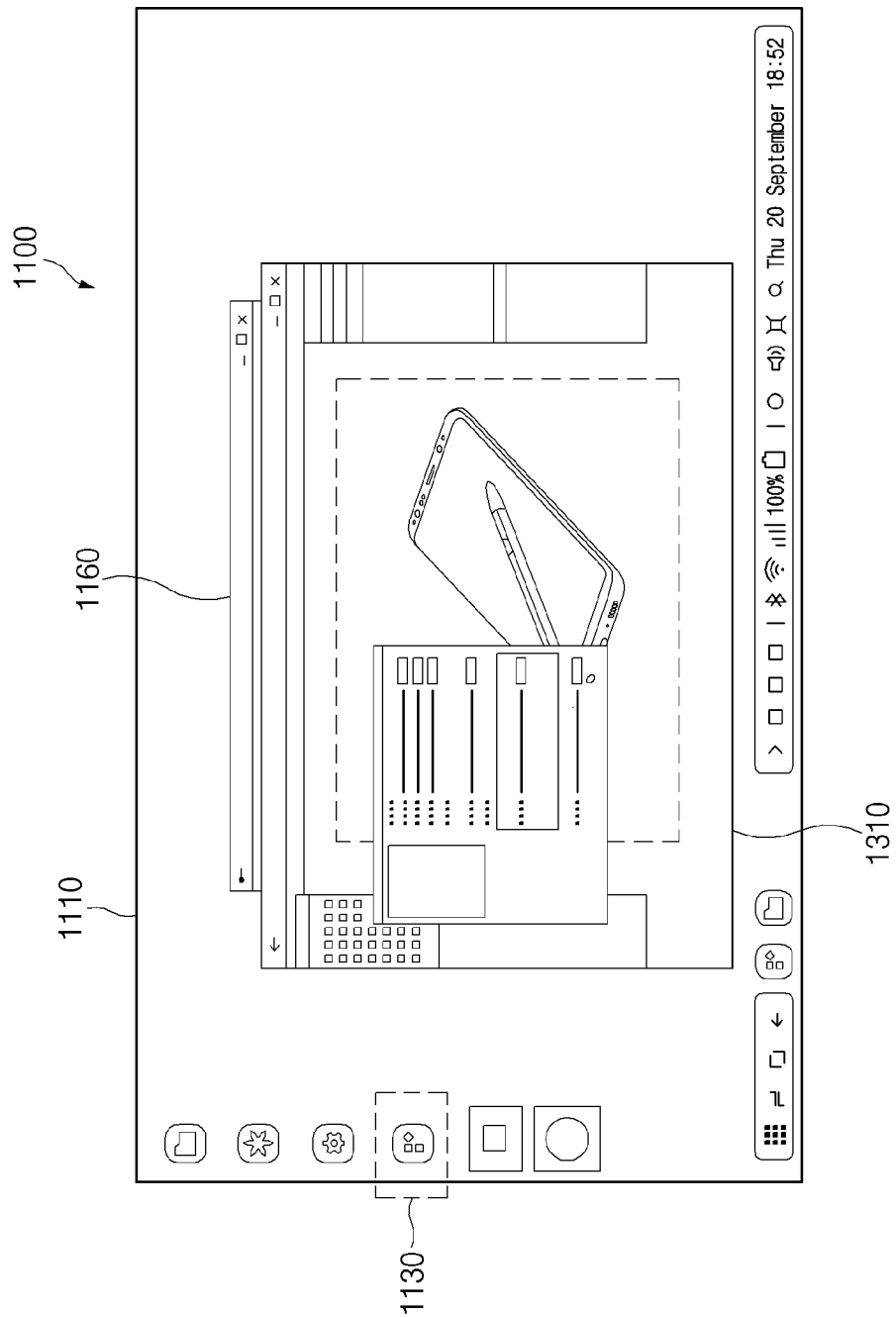
FIG. 13 illustrates an example of a screen output when an electronic device according to various embodiments drives a second operating system in a graphic user interface mode.

FIG. 12 illustrates an example of a screen output when an electronic device according to various embodiments drives a second operating system in a command line interface mode. FIG. 13 illustrates an example of a screen output when an electronic device according to various embodiments drives a second operating system in a graphic user interface mode. According to an embodiment, the exemplary diagram 1100 of FIG. 12 and the exemplary diagram 1100 of FIG. 13 illustrates examples of a screen after the user selects an object for driving the second operating system on the main screen 1110 illustrated in FIG. 11.

According to various embodiments, the main screen 1110 may include an area in which a visual object 1130 for executing a second operating system is disposed. According to an embodiment, the visual object 1130 may be an icon for inputting a command for driving the Linux operating system.

According to an embodiment, the visual object 1130 may correspond to an application operating based on the second operating system. When a user input of selecting the visual object 1130 is received, the electronic device may drive the second operating system and may execute an application corresponding to the visual object 1130 based on the second operating system. In the process of driving the second operating system, the electronic device may change preferences of the second operating system, and a control application operating based on the second operating system may install a package file for controlling an operation of the second operating system with respect to the second operating system.

According to an embodiment, the electronic device may configure a user interface of the second operating system depending on a user interface mode. For example, when the user interface mode is the command line interface mode, the electronic device may display the window 1210 implemented with a command line interface illustrated in FIG. 12. When the user interface mode is the graphic user interface mode, the electronic device may display the window 1310 implemented with a graphic user interface illustrated in FIG. 13.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

The invention claimed is:

1. An electronic device comprising: a memory configured to store a control application and a preferences file; and a processor operatively connected with the memory, and configured to execute the control application in a first operating system, wherein the memory further stores an operating system image for executing a second operating system, and wherein the memory stores instructions that cause the processor to: determine whether preferences of the operating system image satisfy a defined condition in the control application; change the preferences of the operating system image by using the preferences file when the preferences of the operating system image do not satisfy the defined condition; and copy, to the operating system image, a package file for allowing the control application to control an operation of the second operating system;
wherein the package file includes an installation file of a package operating in the second operating system, an executable file for communicating with the control application, and a shell script file performing a specified operation in the second operating system.

2. The electronic device of claim 1, wherein the processor is further configured to:
transfer a message to a background program supporting a mount control of a file system, the message requesting to determine whether the operating system image is an image available by the control application; and
receive information on whether the operating system image is available, as a response to the message.

3. The electronic device of claim 2, wherein the processor is further configured to:
when the operating system image is the image available by the control application, mount the operating system image by using the background program; and
when an authority of a root path of the mounted operating system image does not satisfy a specified condition, change the authority to satisfy the specified condition.

4. The electronic device of claim 1, wherein the defined condition is not satisfied when at least one of a user ID and a group ID of an authority of a root path of the operating system image is not included in a region that the control application defines.

5. The electronic device of claim 4, wherein the region is that values of the user ID and the group ID are a multiple of "65536" and last five digits of a decimal number is "0".

6. The electronic device of claim 1, wherein the processor is further configured to:
select a user interface mode with respect to the second operating system; and
install the package file based on the selected user interface mode.

7. The electronic device of claim 6, wherein the user interface mode is one of a command line interface mode or a graphic user interface mode.

8. The electronic device of claim 7, wherein, when the selected user interface mode is the graphic user interface mode, the processor is configured to install at least one of a program package for receiving and playing, at the first operating system, a sound generated in the second operating system or a program package for remotely controlling a graphic desktop system of the second operating system, with respect to the operating system image.

9. The electronic device of claim 1, wherein the processor is further configured to:
determine whether the operating system image is available by the control application, in response to a user input of selecting the operating system image;
when the preferences of the operating system image do not satisfy the defined condition, execute the second operating system in a container being based on a kernel of the first operating system for execution of the first operating system after changing the preferences of the operating system image and copying the package file to the operating system image;
obtain, at the first operating system, data associated with a program executable in the second operating system through socket communication that uses a program installed on the package file; and
control hardware included in the electronic device so as to process the obtained data, based on the first operating system by using the control application.

10. The electronic device of claim 1, wherein the first operating system is an Android operating system, and the second operating system is a Linux operating system.

11. A method for controlling an electronic device, the method comprising: executing a control application based on a first operating system installed on the electronic device; receiving a user input of selecting an operating system image for executing a second operating system; determining whether preferences of the operating system image satisfy a defined condition in the control application; changing the preferences of the operating system image by using a preferences file when the preferences of the operating system image do not satisfy the defined condition; and copying, to the operating system image, a package file for allowing the control application to control an operation of the second operating system;

wherein the package file includes an installation file of a package operating in the second operating system, an executable file for communicating with the control application, and a shell script file performing a specified operation in the second operating system.

12. The method of claim 11, further comprising:

transferring a message to a background program supporting a mount control of a file system, the message requesting to determine whether the operating system image is an image available by the control application; and receiving information on whether the operating system image is available, as a response to the message.

13. The method of claim 12, further comprising:

mounting the operating system image by using the background program when the operating system image is the image available by the control application, wherein, when an authority of a root path of the mounted operating system image does not satisfy a specified condition, the changing of the preferences includes:

changing the authority to satisfy the specified condition.

14. The method of claim 11, wherein the defined condition is not satisfied when at least one of a user ID and a group ID of an authority of a root path of the operating system image is not included in a region that the control application defines.

15. The method of claim 14, wherein the region is that values of the user ID and the group ID are a multiple of "65536" and last five digits of a decimal number is "0".

16. The method of claim 11, further comprising:

selecting a user interface mode associated with the second operating system, wherein the copying of the package file to the operating system image includes:

copying the package file to the operating system image based on the selected user interface mode.

17. The method of claim 16, wherein the user interface mode is one of a command line interface mode or a graphic user interface mode.

18. The method of claim 17, wherein when the selected user interface mode is the graphic user interface mode the copying of the package file to the operating system image comprises:

installing at least one of a program package for receiving and playing, at the first operating system, a sound generated in the second operating system or a program package for remotely controlling a graphic desktop system of the second operating system, with respect to the operating system image.

\* \* \* \* \*